United States Patent
Lewis

[15] 3,683,854
[45] Aug. 15, 1972

[54] APPARATUS FOR SEPARATING VIABLE FISH EGGS FROM NON-FERTILIZED EGGS

[72] Inventor: Raymond H. Lewis, West Palm Beach, Fla.

[73] Assignee: Oceanography Mariculture Industries, Inc., Riviera Beach, Fla.

[22] Filed: Sept. 17, 1970

[21] Appl. No.: 73,102

[52] U.S. Cl.................................................119/3
[51] Int. Cl..........................................A01k 61/00
[58] Field of Search............119/3, 2, 4, 5; 43/55, 56

[56] References Cited

UNITED STATES PATENTS

| | | | |
|---|---|---|---|
| 2,722,770 | 11/1955 | Giordano | 43/55 |
| 173,262 | 2/1876 | Brackett | 119/3 |
| 180,085 | 7/1876 | Wilmot | 119/3 |
| 680,838 | 8/1901 | Bourgeois | 119/3 |

*Primary Examiner*—Hugh R. Chamblee
*Attorney*—Oblon, Fisher & Spivak

[57] ABSTRACT

The property of certain marine fish eggs to become buoyant when they are fertilized is utilized by placing such eggs in a container having an upper portion with a water permeable wall, a lower funnel-shaped portion removably secured to the upper portion and a buoyant collar for floating the container in a body of water with the water permeable wall disposed below the water level therein. After fertilization occurs, the buoyant viable eggs may be kept in the upper portion of the container afloat in the water while the funnel-shaped lower portion is removed for separating the unfertilized eggs collected therein.

9 Claims, 1 Drawing Figure

PATENTED AUG 15 1972
3,683,854
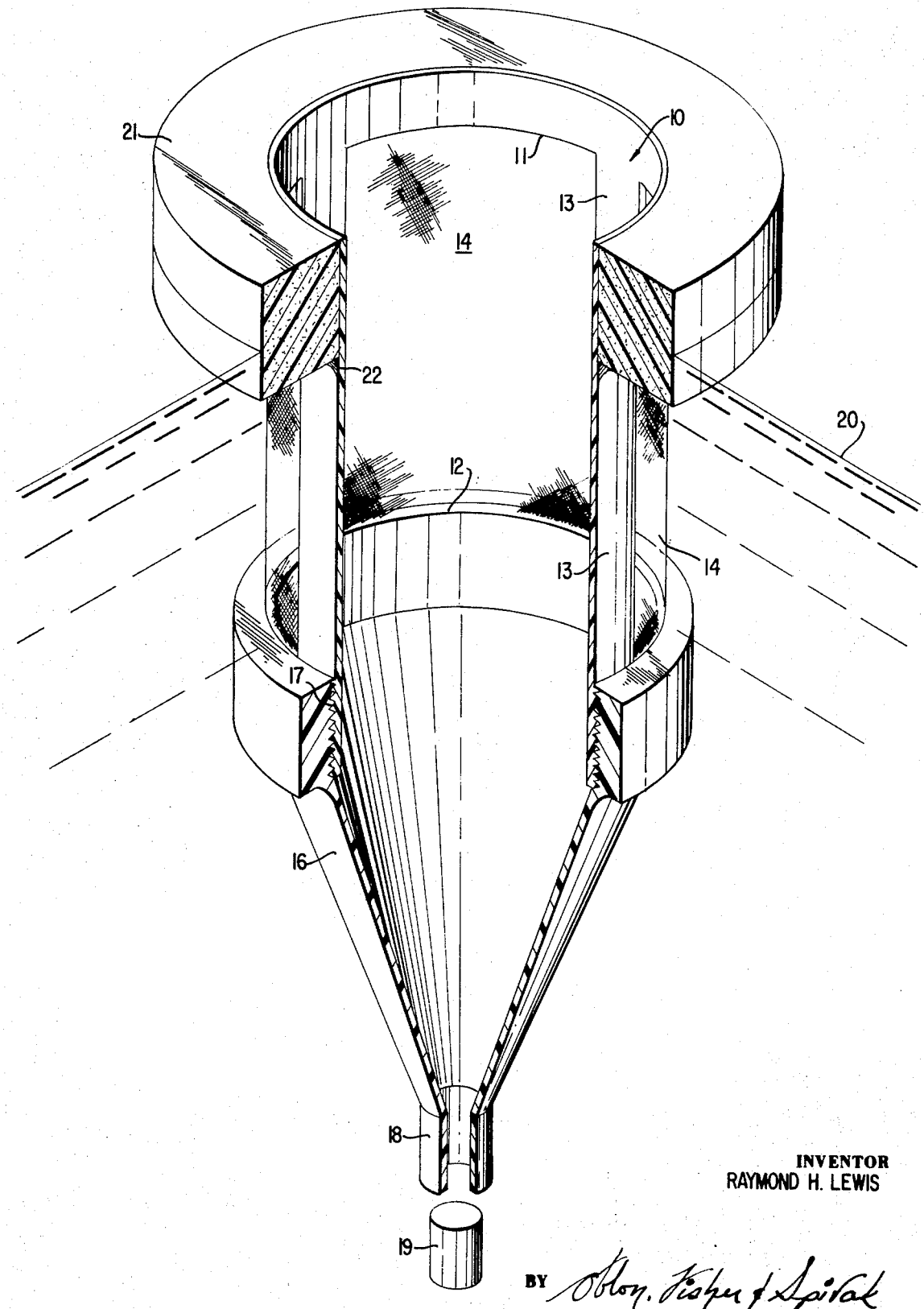
INVENTOR
RAYMOND H. LEWIS
BY Oblon, Fisher & Spivak
ATTORNEYS ns rigid 3,683,854

APPARATUS FOR SEPARATING VIABLE FISH EGGS FROM NON-FERTILIZED EGGS

BACKGROUND OF THE INVENTION

The present invention relates generally to fish production in mariculture and, more particularly, to an apparatus and method for separating viable fish eggs from non-fertilized eggs.

In the practice of spawning and hatching fish, receptacles are commonly employed which are constructed in such a manner as to permit a flow of water therethrough for the purpose of providing a gentle circulation of water over the eggs contained therein to maintain the same continuously in motion. Heretofore, however, those who were engaged in the artificial propagation and raising of fish have generally concerned themselves only with the various species of fresh water fish and these receptacles accordingly have been designed primarily to accommodate the characteristics of fresh water fish, with little, if any, consideration being given to design characteristics which might benefit the propagation of salt water, estuarine, or marine fish, as they may more broadly be classified.

An ever-increasing demand, however, accompanying the world's so-called "population explosion," for greater supplies of food fishes and the healthful protein which comes therefrom has caused this industry only recently to extend its consideration of the edible fishes to include the marine varieties. Thus, in contrast to certain species of fish which live and/or breed in fresh water, such as, for example, trout and salmon, and produce demersal eggs, which are negatively buoyant and sink to the bottom of the fresh spawning waters, many species of marine fish, such as, for example, the highly flavorful pompano, produce eggs which are buoyant, so that they float near the surface. This is the case because the larva of the pompano, as well as many other species of marine fish, is a pelagic plankton feeder, whereby it is essential for its survival that it be hatched in the proper feeding environment near the surface. Accordingly, the viable egg is provided with a globule of oil which produces the required buoyancy.

This buoyant property is advantageous to the fish "farmer," since it may readily be utilized as an aid in separating the viable fish eggs from dead, or non-fertilized, eggs. The spawning and hatching receptacles heretofore used in the "farming" of fresh water fish, however, are not peculiarly adapted for separating live eggs from dead eggs of marine fish since, in the former case, as hereinabove indicated, the dead eggs evidently rise to the surface and may be carried off with overflow of water being circulated therethrough or removed in some other manner, whereas, in the case of the marine fish characterized herein, it is the live eggs which become buoyant and float on the surface of the water, thereby precluding the usual separation techniques facilitated by the receptacles heretofore available and specially designed with the fresh water fish characteristics in mind.

SUMMARY OF THE INVENTION

Accordingly, it is an object of the present invention to provide an apparatus for separating the viable eggs from the non-fertilized eggs of marine fish.

Another object of the present invention is to provide an improved apparatus for separating the viable eggs from the non-fertilized eggs of marine fish.

Another object of the present invention is to provide an improved apparatus for separating the viable eggs of marine fish from the dead, or non-fertilized, eggs thereof which utilizes the buoyant property of the viable eggs to administer the separation.

Still another object of this invention is to provide an apparatus for automatically separating the viable eggs of marine fish from the non-fertilized eggs thereof and for continuously administering a relatively gentle circulation of water about the eggs.

A further object of this invention is to provide an improved apparatus for separating the viable eggs from the non-fertilized eggs of marine fish which also readily permits handling of the separated viable eggs for transferring the same to an incubation, or hatching, tank.

The foregoing and other objects are achieved, according to one aspect of the present invention, by causing fertilization of the eggs to occur within the bottom portion of a receptacle having a level of water therein which is continuously maintained by a gentle circulation of water therethrough. When fertilization occurs, the eggs become buoyant and float to the top, whereupon the non-fertilized eggs remaining in the receptacle bottom may be easily removed through a bottom opening without disturbing the floating viable eggs. A preferred embodiment of the separator receptacle comprises a floatable housing having a water permeable wall for permitting water from a tank or the like in which the housing is being floated to freely circulate therethrough and a funnel-shaped bottom which threadably engages the housing and thereby is readily disengageable therefrom for removing the dead, or non-fertilized, eggs while permitting the housing and the buoyant, viable eggs therein to remain afloat in the water tank.

BRIEF DESCRIPTION OF THE DRAWING

Various other objects, features and attendant advantages of the present invention will be more readily appreciated as the same becomes better understood from the following detailed description when considered in connection with the accompanying drawing in which the single FIGURE thereof is a perspective view, being partly in section, of a preferred embodiment of a separator receptacle constructed according to the teachings of the invention, and shown with the bottom closure plug therefor being removed from the funnel-shaped housing bottom.

DESCRIPTION OF A PREFERRED EMBODIMENT

Referring now to the sole FIGURE of the drawing, a separator housing is shown which comprises a substantially tubular configured support structure generally indicated by the reference numeral 10 and being formed from a pair of spaced, parallel annular rings 11 and 12, respectively, which are integrally connected by a plurality of elongate and parallel elongate ribs 13, being shown four in number and being equidistantly spaced apart about the circumferential wall of the tubular configuration being thereby formed. The structure 10 supports a fine mesh screen 14 of suitable material, preferably nylon, which is affixed to the annular rings 11 and 12 and the ribs 13 for forming a substantially tubular shaped wall through which water may freely pass, but which also serves to prevent eggs from being displaced from within the structure and debris from entering the same with the water being circulated therethrough. Obviously, instead of a single piece of screen 14 as hereinbefore indicated, separate pieces of screen material might be attached between the several pairs of adjacent elongate ribs 13. Preferably, the ribs 13 and annular rings 11 and 12, forming the support 10, are constructed of polyvinylchloride, but it is understood that other materials suitable for the purpose can be used.

A substantially conical funnel 16, which is preferably constructed of polyethylene, although other suitable materials may also be used, is internally threaded at the wide mouth end thereof for engaging external threads on the annular ring 12 of support 10 for securing the same together as shown at 17. The other end of the funnel 16 terminates in a short tubular portion 18 which extends from the narrow mouth end of the funnel and is integrally formed therewith, and thereby readily facilitates closure of the same by inserting a cylindrical plug 19 whenever desired.

Positive buoyancy for the support 10 and the funnel 16, when the same are disposed as a unit in a body or tank of water 20, is provided by a foamed polystyrene collar 21 which is secured to the outer surface of the annular ring 11 by a suitable marine type adhesive, as shown at 22. It is to be understood, of course, that although collar 21 is preferably constructed of polystyrene, other suitable materials or floats can also be used for the same purpose.

In practicing the present invention, the separator housing is floated in the water 20 at the level of the polystyrene collar 21, whereby it becomes filled with water to the same level by water passing freely through the nylon mesh screen 14. The plug 19, of course, is inserted prior to floating the device.

Fish spawn eggs and sperm are mixed in a suitable container and placed in the top of the separator housing, where they sink to the bottom, collecting in the small portion of the funnel 16 just above the plug 19. When fertilization occurs, as hereinbefore indicated, the eggs, in the case of many species of marine fish, become buoyant and float to the top where, while being enclosed within the screened support 10 and floating at the level of the buoyant collar 21, they are maintained continuously in a gentle state of motion by the circulation of water naturally occurring through the mesh screen 14.

After all fertilization has taken place, the non-viable eggs remain at the bottom. With the separator housing still being kept in the water, the funnel 16 can then be unscrewed from the support structure 10, and the non-viable eggs therein can thus be removed without disturbing the viable eggs floating within the confines of the screened support structure. Subsequently, the funnel 16 can be repositioned on the bottom, threaded portion of the support structure 10 and the complete separator housing unit may be lifted from the water 20, whereupon the water level therein will recede to the level of the top of the funnel 16. The viable eggs, still afloat therein, may thus be readily transferred to another water tank, such as, for example, one which is suitably designed and conditioned for hatching the eggs.

Obviously, many modifications and variations of the present invention are possible in light of the above teachings. For example, instead of keeping the top of the separator housing open, as illustrated herein, a removable cover may be provided. Also, a key and notch coupling arrangement may be substituted for the threaded connection of the support structure and the funnel. It is to be understood, therefore, that within the scope of the appended claims, the invention may be practiced otherwise than as specifically described herein.

What is claimed and desired to be secured by letters patent of the United States is:

1. An apparatus for separating viable fish eggs from non-fertilized eggs, comprising:
    a housing having a water permeable wall,
    a receptacle removably secured to said housing being open at its ends and decreasing in cross-sectional area from one end to the other, with the larger end thereof being secured to said housing and opening thereinto,
    means for selectively closing the other end of said receptacle, and,
    means for floating said housing and said receptacle in water.

2. The apparatus set forth in claim 1, wherein said receptacle is a conical funnel.

3. The apparatus set forth in claim 1, wherein said housing is tubular in configuration and said receptacle is a conical funnel, and said housing and said receptacle are secured together by engagement of threaded portions thereon.

4. The apparatus set forth in claim 1, wherein said housing is tubular in configuration and is threaded at one end, said receptacle is a conical funnel threaded at its large end for being engaged with said housing threads, and said floating means is a buoyant member secured to the end portion of said housing opposite said threaded end thereof.

5. The apparatus set forth in claim 4, wherein said buoyant member is an annular collar affixed to the outer wall of said tubular housing.

6. The apparatus set forth in claim 5, wherein said buoyant collar is constructed from a foamed plastic material.

7. The apparatus set forth in claim 4, wherein said buoyant member is constructed of foamed polystyrene.

8. The apparatus set forth in claim 4, wherein said water permeable wall of said housing includes a fine nylon mesh screen forming at least part of the tubular wall surface thereof.

9. An apparatus for separating viable fish eggs from non-fertilized eggs, comprising, in combination:
    a tubular housing having at least part of its wall being constructed of a water permeable material, and being threaded at one end;
    a funnel-shaped and open-ended receptacle being threaded at the largest open end thereof for threadably connecting the same to said tubular housing;
    a collar of buoyant foamed plastic material adhesively secured to the other end of said tubular housing; and,
    a plug for closing the smallest open end of said receptacle.

* * * * *